ન3,433,830
**ALIPHATIC DICARBOXYLIC ACID
PURIFICATION PROCESS**
John B. Wilkes, Albany, Calif., assignor to Chevron
 Research Corporation, San Francisco, Calif., a
 corporation of Delaware
No Drawing. Filed Sept. 30, 1964, Ser. No. 400,593
U.S. Cl. 260—514                                      2 Claims
Int. Cl. C07c 55/02

ABSTRACT OF THE DISCLOSURE

Extractive process for the purification of aqueous salt solutions of dibasic aliphatic acids which contain salts of monobasic aliphatic acids as impurities using as the extractant a hydrocarbon solution containing inert organic oleophilic extractive adjuvant.

---

This invention relates to a method for the purification of intermediate molecular weight range aliphatic dicarboxylic acids. More particularly, it relates to a method for an assisted extractive removal of monocarboxylic acid impurities present as salts in aqueous alkaline salt solutions of aliphatic dicarboxylic acids.

Dicarboxylic aliphatic acids are useful for the production of polymers such as polyesters, polyamides, polyacid anhydrides, and the like, but when these polymer-formers contain relatively small amounts of monocarboxylic acid impurities, their resulting polymers are in general inferior because the monocarboxylic acids are chain-stoppers in the polymer-forming reactions. Ordinary methods of purification, such as distillation and recrystallization are not particularly effective. Dicarboxylic aliphatic acids have relatively high boiling points, and suffer degradation reactions at distillation temperatures. Monocarboxylic acid impurities normally found associated with such dicarboxylic acids, on the other hand, are well known to co-crystallize with the dicarboxylic acids, thus requiring multiple recrystallization stages in order to achieve the high degree of dicarboxylic acid purity required for use in polymer-forming reactions.

It has now been found that organic monocarboxylic aliphatic acid impurities can be removed from aqueous alkaline salt solutions of intermediate molecular weight, that is $C_5$ to about $C_{10}$ aliphatic dicarboxylic acids, by a contacting of their aqueous salt solutions under partition conditions with an inert hydrocarbon solvent, provided the aqueous salt solution has pH less than about 7.0, but greater than the incipient precipitation pH of the acid being purified. A substantially improved purification result provided further that the above extraction is carried out in the presence of at least about 0.1 weight percent, based on the inert hydrocarbon solvent employed, of an inert organic oleophilic extraction adjuvant. Surprisingly, in view of the fact that the subject purifications are applied to essentially aqueous salt solutions, monocarboxylic acid impurities are nevertheless removed from these aqueous alkaline salt solutions. The free acid is recoverable from the hydrocarbon extraction solvent medium employed. The presence of the added adjuvant substantially improves the ability of the hydrocarbon extraction solvent to remove the monocarboxylic acid impurities from their salt solutions.

By an inert organic oleophilic extraction adjuvant is meant in general and by definition organic compounds having a substantial hydrocarbon portion, i.e., of at least a four carbon atom inert hydrocarbyl group, and a nucleophilic substituent component of at least one nonmetallic element of atomic number less than 18, having at least one pair of free electrons, for example as in carboxyl oxygen, amino and amido nitrogen, hydroxyl oxygen, alkyl halide and the like, and additionally having a relative benzene to water solubility ratio at 25° C. of at least about 5 and an appreciable solubility in hydrocarbon extraction solvents, i.e., of at least about one weight percent in the range 0°–150° C. and having an acid strength pKa at 25° C., less than about 8.

For reasons of practicality, molecular weights of useful adjuvant compounds are desirably below about 900 molecular weight units, preferably below about 450 but greater than about 74 units.

In general, and for better results, the acid strength of the adjuvant should be at least about 2 pKa units less than the highest pKa value of the dicarboxylic aliphatic acid being purified.

Particularly preferred extraction adjuvant compounds contemplated for use in the process are represented by the general formula:

$$R_nX$$

in which R is an inert hydrocarbyl, i.e., composed of carbon and hydrogen, radical having at least 4 carbon atoms but not more than 6 aromatic carbocyclic carbon atoms. X in the formula is an inert nucleophilic substituent group composed of from 1 to about 24 atoms of nonmetallic elements of atomic number less than 18; $n$ is a number in the range 1–3 inclusive. Where $n$ is greater than 1, R may be the same, and different radicals.

In general, and for practical reasons, hydrocarbyl groups of less than 21 carbon atoms per group are contemplated in the above formulation and include aliphatic hydrocarbyl groups hereinafter described, as well as benzene hydrocarbon radicals.

In the above general formula representative X nucleophilic substituent groups contemplated include the following groups: $-CONH_2$, $-OH$, $-CO_2CH_3$,

$=CO$, $-COCH_3$, $-COC_2H_5$, $-CONH(CH_3)$, $-NO_2$,
  $-C\equiv N$, $=SO$, $=SO_2$, $-SOCH_3$, $-SO_2CH_3$,
  $-CONHC_3H_7$, $-CHO$, $-SO_2NH_2$, $SO_2NH(C_3H_7)$,
  $-CON(C_2H_5)_2$, $-CO_2C_3H_7$, $-Cl$, $-OP(OC_2H_5)_2$,
  $-O-$, $-CO_2$, $-OCH_3$, $-OC_3H_7$, $-COC_3H_7$,
$-CON(C_3H_7)_2$, and the like, that is nucleophilic inert substituent groups composed of from 1 to about 24 nonmetallic atoms of elements having atomic numbers less than 18 and having at least one pair of free electrons.

Representative extraction adjuvant compounds contemplated for use in the present process are stearamide, benzenesulfonamide, cyclohexanol, diethylphthalate, 2-ethyl-1-hexanol, tri-n-hexylamine, ethylbenzoate, valeramide, valerolactam, n-dodecanoic amide, toluamide, p-t-butylbenzamide, isobutryric amide, propyl benzoate, propyl hexanoate, ethyl cyclohexancarbanoate, 2-methyl-1-hexanol, n-dodecanol, cyclohexanone, N,N-diethylbenzamide, nitrobenzene, n-octanol, n-octanol-2, n-decylsulfonamide, n-dbutylsulfoxide, di-n-decylsulfone, 4-n-octylphenol, n-$C_{16}H_{31}CO_2NH_2$, benzonitrile, tolunitrile, isophthalonitrile, 4-n-hexylbenzamide, methylphenyl ether, 4-n-butylpyridine, quinoline, 2-chloropyridine, di-i-butylsulfoxide, di-n-hexylamine, decylamine, (n-$C_{20}H_{41}$)$_3$N, trioleylamine, N,N-dipropylvaleramide, s-octyl-n-propyl-ketone, and the like compounds including inert mixtures thereof.

The purifiable dicarboxylic aliphatic acids contemplated as feeds for the present purification process for practical purposes must have some appreciable water solubility in the form of their alkaline salts and, in general, the salt should be water soluble at least to the extent of about 5 weight percent.

In general, the purifiable acids contemplated as feeds for the present purification process may be characterized by the general formula:

$$R(CO_2H)_2$$

wherein R is an inert aliphatic hydrocarbyl radical having from 3 to 8 carbon atoms per group and in which the term hydrocarbyl is meant by definition that the group is composed of carbon and hydrogen and structurally may be alkyl, alkenyl, cycloalkyl, cycloalkenyl, branched- and straight-chained and combinations thereof including alkylcycloalkyl, alkylcycloalkenyl and alkenylcycloalkyl.

By the term "inert" wherever used herein is meant that less than 1% of the material is susceptible to chemical transformation under the influence of water and substantially neutral alkali metal carboxylate salt solutions at temperatures in the range 0–150° C. during the partition period, i.e., of the order of 0.01 to 1 hour.

Monocarboxylic acid impurities, removable by the subject process, are those normally associated as byproducts in partial oxidations of cycloalkenes, cycloalkenyls and the like, including liquid phase nitric acid oxidations.

Monocarboxylic organic acids, in general, having at 25° C. a solubility per unit volume in benzene at least about 50 times the corresponding solubility in water, are extractable from the aqueous salt solutions of the present invention.

By inert hydrocarbon solvents is meant, in general, hydrocarbons having from about 5 to 50 carbon atoms per molecule and mixtures thereof. In particular, and because of the economic advantages from their use, by hydrocarbon solvents is meant petroleum refinery hydrocarbon cuts including kerosene cuts, aromatic hydrocarbon cuts and mixed paraffin hydrocarbon and aromatic hydrocarbon and aromatic hydrocarbon refinery cuts. Representative specific hydrocarbons are benzene, toluene, xylene, cymene, pseudocumene, tertiarybutylbenzene, hexane, isoheptane, decane, $C_7C_{10}$ aromatic hydrocarbon refinery cuts, and the like, that is liquid hydrocarbons substantially chemically unreactive towards water and alkali at temperatures in the range of 0–150° C.

By partition conditions, in terms of the foregoing described aqueous and inert hydrocarbon solvent phases, is meant dynamic intermixing and movement of the aqueous and hydrocarbon phases, including countercurrent and concurrent flow while there is interphasial contact between comparable volumes of each phase, at temperatures in the range from about 0° C. up to about 150° C. and under pressures sufficient to substantially maintain both the aqueous and the hydrocarbon liquid phases. By comparable volumes, in terms of the aqueous solvent phase, is meant from about 10 up to 1,000 volume percent of the hydrocarbon phase.

Because of their generally superior processing characteristics, including lower incipient precipitation pH's and lower cost, the use of ammonium salt solutions are particularly preferred in the present process.

In a preferred embodiment of the present process, about a 10–30 weight percent aqueous ammonium salt solution of an impure aliphatic dicarboxylic acid is prepared. The pH of the solution is adjusted to a value less than about 7.0, preferably to the incipient organic acid precipitation pH, and the solution is filtered, if required, to remove trace amounts of insoluble matter which may be present. At a temperature in the range from about 10–100° C., about one volume of mixed commercial xylene is thoroughly contacted under partition conditions with about 3 volumes of the pH-adjusted aqueous ammonium salt solution in the presence of about 1–10 weight percent, based on the xylene of 2-ethylhexanol. The extractive removal of the monocarboxylic acid impurity is rapid, commencing immediately upon the contacting, and the partition equilibration is usually reached within a few minutes or at least to within a practical degree within such time. The two phases, aqueous and hydrocarbon, are then separated. Usually several such extractions are all that are required for an efficient removal of the monocarboxylic acid impurity. During the extraction process, the solution pH tends to increase. This may be corrected conventionally by addition of small amounts of mineral acid, if the pH increase is excessive, having in mind the approximately 7.0 pH threshold value for the present process.

Dilute, as well as concentrated and even saturated solutions of the ammonium salts, above described, are suitable for use in the process.

Frequently, where carbon treating is desirable because of the color body impurities in the feed acid, such treating is advantageously given the aqueous solution after the partition. The extraction appears to remove material from the aqueous solution which interferes in an appreciable degree with the solution decolorization by activated carbon.

Recovery of the purified dicarboxylic acid, using common mineral acids or water-soluble organic acids having ka values substantially higher than those of the dibasic acid, is thereafter accomplished conventionally.

When the aqueous solution pH is appreciably greater than 7.0, for example, 7.5 and higher, the extraction of the impurities is greatly hindered and, in general, unsatisfactory. On the other hand, when the solution pH is as low as about 5.1 and lower, depending upon the particular feed being purified, very finely divided solids tend to form. These solids seriously interfere in the extraction due to an interaction between them, water, and hydrocarbon, which results in an interphasial cuff-layer making phase separation difficult to impossible. At still lower pH values, the aliphatic dicarboxylic acids are liberated and lixiviation of this solid is generally unsatisfactory. Extraction of salt solutions having pH values less than about 7.0 but greater than incipient organic acid precipitation values are preferred.

Relatively small amounts, in general, of extraction adjuvant compound, for example, of the order of 0.1 percent by weight of the hydrocarbon solvent, effects some improvement in the present process. Where the amount of impurity is known, from one to two times the molar stoichiometric amount of adjuvant is usually fully satisfactory. Larger relative amounts can be used, for example 25% hydrocarbon, 75% adjuvant, but because in general the adjuvant compounds are far more costly than the hydrocarbon solvent, as much as possible of the purification burden is desirably borne by the latter. In general, the use of the adjuvant without sufficient added hydrocarbon, i.e., 5% or less of the hydrocarbon by volume, results in coextraction of appreciable amounts of the dicarboxylic acid from its salt. On the other hand, a useful expedient is to alternately extract the aqueous salt solution with the hydrocarbon plus adjuvant followed by a dilute aqueous counter extraction of the separated hydrocarbon phase to remove monocarboxylic acid and thence to return the renewed hydrocarbon to the process. Some provision for partial renewal of the hydrocarbon plus adjuvant is usually desirable to minimize the accumulation of nonacidic impurities.

The data listed in Tables I and II following illustrate the subject purification process. The analyses were made by gas-liquid phase chromatographic techniques. The salts and acids were quantitatively converted to the corresponding methyl esters and the resulting esters chromatographed using appropriate standards.

The salt solution compositions, extraction conditions, and results are stated in the tables.

monobasic acid having a solubility in benzene at least 50 times the corresponding solubility in water, and said dibasic acid salt being of the formula:

$$R(CO_2)_2M_2$$

wherein R is an inert aliphatic hydrocarbyl radical containing from 3 to 8 carbon atoms and M is selected from the group consisting of alkali metal and ammonium cations, said solution being maintained at a pH less than about 7.0 but greater than the incipient organic acid

TABLE I.—SEPARATION OF ADIPIC AND CAPROIC ACID BY EXTRACTION OF SALT SOLUTIONS

| Run No. | Temp., °C. | Solvent and Adjuvant | Volume Ratio Organic: Aqueous Phases | Number of Extractions | cc. 0.1 N NaOH to Neutralize 25 cc. Solvent | Product Analysis, Aqueous Phase | |
|---|---|---|---|---|---|---|---|
| | | | | | | Adipic, percent | Caproic, percent |
| Extraction of Ammonium Salt Solution [1] | | | | | | | |
| 1 | | Feed | | (3) | | 88.9 | 11.1 |
| 2 | 21 | Mixed Hexanes | 3:4 | 1 | 4.2 | 91.1 | 8.9 |
| 3 | 21 | ----do---- | 3:4 | 2 | 3.3 | 92.7 | 7.3 |
| 4 | 21 | 25 cc. 2-octanol+50 cc. Hexanes | 3:4 | 1 | 16.9 | 96.1 | 2.9 |
| 5 | 21 | ----do---- | 3:4 | 2 | 6.0 | 98.3 | 1.0 |
| 6 | 21 | 5 cc. Tridodecylamine+70 cc. Hexanes | 3:4 | 1 | | 93.6 | 5.7 |
| 7 | 21 | ----do---- | 3:4 | 2 | | 97.3 | 2.7 |
| 8 | 76 | Toluene | 3:4 | 1 | 9.2 | 92.5 | 7.5 |
| 9 | 76 | ----do---- | 3:4 | 2 | 5.8 | 94.2 | 5.8 |
| 10 | 76 | 25 cc. 2-octanol+50 cc. Toluene | 3:4 | 1 | 17.8 | 94.7 | 4.1 |
| 11 | 76 | ----do---- | 3:4 | 2 | 6.3 | 97.5 | 1.7 |
| 12 | 76 | 5 cc. Tridodecylamine+70 cc. Toluene | 3:4 | 1 | | 93.4 | 6.6 |
| 13 | 76 | ----do---- | 3:4 | 2 | | 96.0 | 4.0 |
| 14 | 76 | 5 g. Lauramide+70 cc. Toluene | 3:4 | 1 | 19.2 | 94.5 | 5.5 |
| 15 | 76 | ----do---- | 3:4 | 2 | 10.0 | 96.5 | 3.5 |
| Extraction of Sodium Salt Solution | | | | | | | |
| 16 | | Feed [2] | | (3) | | 94.2 | 5.8 |
| 17 | 21 | Benzene | 3:5 | 1 | 13.6 | ~99.7 | ~0.3 |

[1] About 10 g. organic acid to 100 cc. of solution, pH 6.0.   [2] About 10 g. organic acid to 100 cc. of solution, pH 5.85.   [3] Feed.

TABLE II.—SEPARATION OF MONOBASIC AND DIBASIC ACIDS BY EXTRACTION OF SALT SOLUTIONS
EFFECTS OF SALT AND pH

| Run No. | Salt | pH | Temp., °C. | Solvent | Volume Ratio Organic: Aqueous Phases | Percent Recovery From Aqueous Phase | cc. 0.1 N NaOH to Neutralize 25 cc. Solvent | Product Analysis, Aqueous Phase | |
|---|---|---|---|---|---|---|---|---|---|
| | | | | | | | | Dibasic, percent | Monobasic, percent |
| Separation of Sebacic and Pelargonic Acids | | | | | | | | | |
| 18 | NH4 | | | | (1) | | | [2]~90.4 | ~5 |
| 19 | NH4 | 5.75 | 88 | Xylene | 1:2 | 99 | | 95.0 | 0.21 |
| 20 | NH4 | 5.75 | 88 | 2-ethyl hexanol | 1:2 | 93 | | 96.7 | 0.07 |
| Separation of 1,3-cyclohexanedicarboxylic and Cyclohexanecarboxylic Acids | | | | | | | | | |
| 21 | Na | | | | (1) | | | 94.36 | 5.66 |
| 22 | Na | 5.85 | 21 | Benzene | 6:11 | 98 | 13.0 | 97.6 | 2.4 |
| 23 | NH4 | 5.85 | | | (1) | | | 94.0 | 6.0 |
| 24 | NH4 | 5.85 | 21 | Toluene | 3:4 | 99 | 10.1 | 97.7 | 2.3 |
| 25 | NH4 | 7.0 | 21 | ----do---- | 3:4 | 99 | 2 | 94.7 | 5.3 |
| Separation of Adipic and Caproic Acids | | | | | | | | | |
| 26 | NH4 | | | | (1) | | | 94.7 | 5.3 |
| 27 | NH4 | 5.8 | 21 | Toluene | 3:4 | 99 | | 97.8 | 2.2 |
| 28 | NH4 | 7.0 | 21 | ----do---- | 3:4 | 99 | | 94.5 | 5.5 |

[1] Feed.   [2] Contained, in addition, 4.6% higher acids.

The above data demonstrate that aliphatic dicarboxylic acids in the $C_5$–$C_{10}$ molecular weight range containing aliphatic monocarboxylic acid impurities can be purified by staged or continuous counter current and concurrent extractions of their aqueous alkaline salt solutions with hydrocarbon solvents. Surprisingly, the monocarboxylic acids per se are removed from the aqueous solution into the hydrocarbon medium in a mechanism which appears to be favored by the presence of the dicarboxylate salts in the aqueous solutions.

Substantially improved extractive removal of the monocarboxylic acid results when minor amounts of a relatively unacidic (carboxylic acid acidity vs. adjuvant acidity) adjuvant having at least one free pair of electrons per molecule is employed.

Aqueous salt solution pH's must be less than about 7.0 (cf. compare runs 25 and 24 and runs 27 and 28) but greater than incipient acid precipitation pH's.

Having described the above invention by examples and description thereof, it is to be understood that no undue restrictions or limitations are to be drawn by reason of the specific examples and that many variations and modifications are within the scope of the invention.

I claim:

1. Process for the purification of an essentially aqueous salt solution of a dibasic aliphatic acid containing as an impurity the salt of a monobasic aliphatic acid, said precipitation pH of said solution, which comprises contacting said salt solution with an inert extraction solution consisting essentially of a mixture of a hydrocarbon solvent selected from the group consisting of hexanes, xylene and toluene and an inert organic oleophilic extraction adjuvant selected from the group consisting of 2-ethylhexanol, 2-octanol, tridodecylamine and lauramide; said mixture containing from about 5 to 99.9 volume percent of said hydrocarbon and from about 0.1 to 95 volume percent of said adjuvant; thereby substantially reducing said monobasic salt content of said aqueous salt solution.

2. The process as in claim 1 wherein said M is ammonium.

References Cited

UNITED STATES PATENTS

| 1,822,016 | 9/1931 | Daniels | 260—524 |
| 2,556,213 | 6/1951 | Pierotti et al. | 260—525 |
| 2,878,276 | 3/1959 | Crowley et al. | 260—533 |
| 2,916,502 | 12/1959 | Allen et al. | 260—537 |

LORRAINE A. WEINBERGER, *Primary Examiner.*

V. GARNER, *Assistant Examiner.*

U.S. Cl. X.R.

260—537, 540